United States Patent [19]

Evans et al.

[11] 4,318,959
[45] Mar. 9, 1982

[54] LOW-MODULUS POLYURETHANE JOINT SEALANT

[76] Inventors: Robert M. Evans, 1365 Forest Hills Blvd., Cleveland Heights, Ohio 44118; Thomas M. Leonard, 2086 Warren Rd., Lakewood, Ohio 44107

[21] Appl. No.: 54,491

[22] Filed: Jul. 3, 1979

[51] Int. Cl.³ .................. D02G 3/00; B32B 27/40
[52] U.S. Cl. .................. 428/364; 428/423.1; 428/424.2; 428/425.6; 428/425.8; 524/507; 524/452
[58] Field of Search ............ 428/425, 424, 364, 423.1, 428/424.2, 425.6, 425.8, 149; 526/352, 88; 162/167, 168 R, 164 R; 260/42.46

[56] References Cited
U.S. PATENT DOCUMENTS

| | | | |
|---|---|---|---|
| 2,808,391 | 10/1957 | Pattison | 528/75 |
| 2,877,212 | 3/1959 | Seligman | 528/75 |
| 3,135,708 | 6/1964 | Muller et a. | 528/75 X |
| 3,179,610 | 4/1965 | Wood | 260/28 R |
| 3,372,083 | 3/1968 | Evans et al. | 428/149 |
| 3,404,130 | 10/1968 | Sigura et al. | 528/28 |
| 3,445,436 | 5/1969 | Lake et al. | 528/75 |
| 3,678,014 | 7/1972 | Suzuki | 526/301 |
| 3,891,610 | 6/1975 | Fowells | 526/352 X |
| 3,920,507 | 11/1975 | Yonemori | 162/164 R |
| 3,920,508 | 11/1975 | Yonemori | 162/168 R |
| 3,920,509 | 11/1975 | Yonemori | 162/164 R |
| 4,059,549 | 11/1977 | Brinkmann | 260/22 TN |
| 4,063,002 | 12/1977 | Wilson | 428/411 |
| 4,078,107 | 3/1978 | Bitterice et al. | 428/424.2 X |

Primary Examiner—Thomas J. Herbert, Jr.
Attorney, Agent, or Firm—Vincent A. Greene

[57] ABSTRACT

A profound improvement in the properties and capabilities of elastomeric polyurethane joint sealing compositions is achieved by incorporating a fibrillated polyolefin of high surface area which is rendered compatible by combining it with effective stabilizing cofillers, such as titanium dioxide, calcium carbonate, carbon black, fibrous talc, serpentine, kaolin, or various other metal silicate fillers. Such cofillers are capable of improving compatibility and stabilizing the sealant mixture so that unacceptable sweat out or exudation of liquid is prevented and so that the outer surface of the applied sealant has an acceptable surface quality after curing.

When 2 to 8 percent by weight of fibrillated polyolefin of macrofibrillar structure, preferably containing macrofibrils with diameters from 1 to 10 microns, is incorporated in a polyurethane joint sealant together with 8 to 30 percent of stabilizing cofillers, it becomes possible to provide revolutionary new joint sealants with remarkable properties, such as Boeing sag values of 0.1 and below for caulking compositions applied to extremely wide joints. These unique non-sag joint sealants can be compounded to form strong soft low-modulus elastomers ideally suited for vertical joints subject to extreme cyclical movement as is common in modern building construction.

13 Claims, 4 Drawing Figures

LOW-MODULUS POLYURETHANE JOINT SEALANT

BACKGROUND OF THE INVENTION

The present invention relates to cold-applied elastomeric-type polyurethane joint sealing compounds for sealing, caulking and glazing operations in building construction and more particularly to non-sag sealants which provide soft low-modulus elastomers suitable for vertical joints and other joints subject to extreme variation in width.

Since 1965 polyurethane joint sealants have been used extensively in the elastomeric sealant industry because of their quality and economy as compared to other sealants. These have functioned satisfactorily in joints whose movement is small. However, the joint widening and closing is a serious problem when the variation in width of the joint is substantial, such as 20 to 25 percent or more, because of the large tensile forces applied to the sealant which can cause adhesive failure or failure of the sealant material itself.

To avoid such failure in joints subject to large variations in width, particularly those frequently changing width due to temperature changes and the like, it is necessary to provide a soft low-modulus elastomer with excellent tensile and elongation properties and excellent weathering properties. This is less of a problem in highway joints where the sealant can be poured in place because non-sag properties are less important. In vertical joints between the concrete panels of a modern building, the problem is very serious because of the importance of sag resistance. If a caulking gun is used, the problem is even more difficult because of the need for good flow properties.

A simple approach to the problem of sealing joints subject to severe variations in width is to employ a non-sag elastomeric-type silicone caulking composition which produces a soft low-modulus elastomeric product. One-component silicone joint sealants are suitable for this purpose but are relative expensive and energy wasteful, have poor tear tear resistance, tend to collect dirt, and cannot be painted.

There is a one-component moisture-curing polyurethane joint sealant made by a Swiss company (SIKA) which employs polyvinyl chloride to achieve non-sag properties without an undue increase in the durometer hardness of the cured sealant. This type of sealant which is disclosed in U.S. Pat. No. 4,059,549, has poor package stability and poor adhesion to water-soaked masonry, and is more difficult to prepare than more conventional polyurethane sealants.*

* See Table I on page 30

There is also a two-component epoxy-type polyurethane joint sealant. It has been on the market for many years under the name "DYMERIC" and is disclosed in U.S. Pat. No. 3,445,436, filed June 14, 1966. This two-component sealant has non-sag properties and when cured has a low modulus (e.g., A Shore A durometer hardness of 45 or less) comparable to that of the SIKA sealant but has poor adhesion to water-soaked masonry and requires mixing on the job.*

* See Table I on page 30

It is preferable to employ one-component sealants and to avoid the extra time and expense involved in mixing two components at the point of use. One-component non-sag moisture-curing polyurethane caulking compositions have been very popular for simple joint sealing operations because of the economy of application, but they present an extremely difficult problem to the compounder. Prior to the present invention, it has not been possible to provide a low-modulus one-component polyurethane sealant of the desired softness with, at the same time, the desired sag resistance and flow characteristics which could be easily manufactured and which meets the federal specifications for Class A cold-applied elastomeric-type joint sealants. Such federal specifications were developed more than a decade ago by the National Bureau of Standards and are set forth in Federal Specifications TT-S-00227B and TT-S-00230C.

Except for the above-described sealants of U.S. Pat. Nos. 3,445,436 and 4,059,549, there was no non-sag polyurethane joint sealant available prior to this invention which could meet such federal specifications for a Class A rating. The known polyurethane sealants could not meet the Class A requirements because they had excessive durometer hardness (e.g., a Shore A durometer hardness of about 60 or greater) when compounded to provide the necessary non-sag properties. Manufacturers of caulking compositions unable to obtain such Class A rating were often unable to sell their product because contracts involving Government construction projects required Class A sealants meeting the federal specifications.

Conventional compounding techniques make it possible to vary the elastomeric properties and flow properties of a polyurethane sealing composition, but it has heretofore been impossible to achieve the desired combination of extrudability, non-sag and low-modulus merely by judicious choice of compounding ingredients or fillers.

Conventional fillers and reinforcements for polyurethanes and plastics, such as silica, talc, calcium silicate, Wollastonite, Asbestine, kaolin, barium sulfate, graphite, hydrated alumina, chrysotile, serpentine, pearlite, vermiculite, mica, crocidolite, zirconium silicate, barium zirconate, calcium zirconium silicate, magnesium zirconium silicate, glass beads, fiberglass, titanium dioxide, PMF mineral fiber, nylon fiber, polyester fiber, alpha cellulose fiber, polypropylene fiber, and the like provide no solution to the problem. Those which are satisfactory fillers for a joint sealant do not provide the desired combination of low-modulus and non-sag properties when used alone or in combination with other conventional fillers. It has heretofore been generally accepted that mixing of different fillers provides no synergistic result and is of no particular consequence when seeking such a combination of properties. This is also true of the conventional fibrillar fillers such as Wollastonite, fibrous talc, asbestos, and processed mineral fiber (PMF).

Fibers used for reinforcing polyurethane products such as glass fibers, nylon fibers, polyester fibers, polypropylene fibers and other synthetic fibers are generally unsatisfactory for polyurethane joint sealants, and particularly one-component caulking compositions. They have poor compatibility and do not disperse properly, and they produce a coarse surface which is unattractive and unacceptable. For these reasons, they have not been used in joint sealants.

Another fiber material, which has hitherto not been used in sealants, is synthetic wood pulp fiber. For many years synthetic fibrillar polyethylene and polypropylene fibers have been produced as a substitute for cellulose fibers with various fiber lengths from 0.7 to 2.5 millimeters or more. These synthetic wood pulp fibers, sold under the name SWP, have been used for various products such as wallpapers, packaging papers, electrical paper, cigarette filters, photographic paper, molded products, masonry cement, body-molding compounds, roofing compounds, traffic paints, plaster repair, non-woven fabric, texture paints, and the like.

Prior to this invention, SWP fibers have been tried in polyurethane joint sealants and other polyurethane compositions and found unsatisfactory particulary because of poor compatibility, excessive sweat out and unacceptable surface quality in the cured product. The fibers tend to project beyond the surface of the cured sealant and provide a coarse surface that is unacceptable.

SUMMARY OF THE INVENTION

Although fabrillated, polyolefins, such as SWP synthetic fiber, with very small size (e.g., a fibril diameter of 10 microns and an average fiber length of 1 to 2 millimeters) have heretofore been found unsatisfactory for polyurethane joint sealants for the reasons stated above, it has now been discovered that fibrillated polyolefins, which would otherwise be unacceptable, can be provided with adequate compatibility by combining them with effective stabilizing cofillers such as calcium carbonate, carbon black, titanium dioxide, fibrous talc, serpentine, kaolin or various other silica or metal silicate fillers. The cofiller, which may be a single filler or a plurality of fillers, functions to improve compatibility and stabilize the sealant mixture so that unacceptable syneresis or exudation of liquid can be prevented. When the cofiller is combined in proper amounts with a fibrous polyolefin of suitable size, morphology and macrofibrillar structure, a polyurethane joint sealant or caulking compound can be made having exceptional non-sag qualities, and such sealants can be applied to a joint and cured to provide a soft low-modulus polyurethane elastomer having excellent tensile and elongation properties and having suprisingly good surface quality and appearance.

The fibrillated polyolefin used in the practice of the present invention has a surface area (BET) of at least 5 square meters per gram and comprises macrofibrils having a diameter from 1 to 20 microns and an average aspect ratio from 20:1 to 200:1 or higher. The average fiber length is preferably less than one millimeter and the fibril diameter is preferably 1 to 10 microns. Best results are obtained using fibrillated polyethlene or polypropylene with a short length (e.g., an average length of from 0.4 to 0.8 millimeters) and a surface area of 8 to 50 square meters per gram which contains at least a major portion by weight of fibrils with a diameter from 1 to 6 microns.

The present invention is particularly well suited for single-component or two-component non-sag cold-applied elastomeric-type joint sealants employing polyurethane prepolymers with free isocyanate groups and a high molecular weight, such as 1,500 or higher. In accordance with the invention, such a non-sag polyurethane joint sealant having a PFER value* of at least 2 and a Boeing sag value* below one, as applied, is greatly improved by incorporating 2 to 8 percent by weight of a fibrillated polyolefin as described above and 8 to 30 percent by weight of compatible cofiller that stabilizes the composition to prevent substantial sweat out. The amounts of the polyurethane prepolymer, fibrillated polyolefin, cofiller, and plasticizer or other compounding ingredients are selected to provide a non-sag joint sealant or caulking compound which can be applied and cured under ambient conditions to provide a strong soft low-modulus polyurethane sealant with a suitable Shore A durometer hardness (e.g., no more than 45 and preferably 20 to 40). The unique combination of macro-fibrillar polyolefin and stabilizing cofiller is particularly advantageous in one-component moisture-cured polyurethane caulking compositions. The combination simplifies compounding of non-sag polyurethane sealants and makes it possible to provide revolutionary sealants with remarkable properties, such as Boeing sag values* of 0.2 or below in low-modulus sealants to be applied to extremely wide vertical joints, or very low modulus and improved physical properties in a caulking composition to be applied to joints subject to extreme cyclical variations in joint width.

*Note: See Definitions which follow.

A polyurethane joint sealing composition according to this invention may, for example, comprise 30 to 70 percent by weight of a polyurethane prepolymer having an average molecular weight of 1000 to 25,000 or more and a substantial NCO content, such as 1 to 5 percent, up to 45 percent of a plasticizer, up to 2.5 percent of an adhesion promoter, 2 to 8 percent of a fibrillated polyolefin of the character described above, and 8 to 30 percent of a compatible stabilizing cofiller. The amount of the fibrillated polyolefin may be only a few percent and still provide excellent non-sag properties when the polyolefin contains a major portion of macrofibrils with a diameter of 1 to 6 microns and has a low fiber length such as 0.4 to 0.8 milimeter. A non-sag polyurethane sealant compounded in these proportions may be a one-component moisture-curing calking composition with a PFER value of 2 to 6 or greater and a Boeing sag of 0.1 to 0.9 or less which cures in ambient air at 40 to 50 percent relative humidity to provide a strong soft elastomeric material with an elongation of 150 or 300 percent and a Shore A durometer hardness anywhere from 20 to 45. Such a composition can easily be compounded to meet and exceed the requirements of Federal Specification TT-S-00230C and to function extremely well in horizontal or vertical joints subject to variations in width in excess of 25 percent as commonly occurs in modern building structures.

The present invention applies to polyurethanes prepared by reacting an organic polyisocyanate with various polyols, polyamines, and other polymers having active hydrogen groups reactive with the isocyanate. The reactive polymer can, for example, be a hydroxyl-terminated polyester, polyether or polydiene. If a low moisture vapor transmission (MVT) rate is desired, as in the case of a non-sag joint sealant for double-pane insulating glass, a polydiene such as polybutadiene is an excellent choice.

An object of the present invention is to provide an inexpensive elastomeric-type non-sag polyurethane caulking composition with low-modulus properties suitable for joints subject to severe movement tending to cause adhesive or sealant failure.

A further object is to provide a one-component moisture-curing polyurethane joint sealant composition which can readily be compounded to obtain excellent non-sag properties together with low-modulus and other physical properties needed for joints subject to extreme movement.

Another object is to provide a non-sag polyurethane caulking composition which is more reliable than materials now in commerical use.

Another object is to provide a versatile filler system applicable to all types of polyurethane sealing compositions.

Another object of the invention is to provide a joint sealant with improved physical properties suitable for swimming pools and other underwater applications.

A still further object of the invention is to provide an improved non-sag polyurethane sealant with a low MVT rate and improved performance in double-pane insulating glass.

Another object of the invention is to provide a high quality polyurethane joint sealant with an extremely high resistance to sag suitable for caulking of wide vertical joints with a width of 3 centimeters or more.

Another object is to provide a non-sag polyurethane sealant with a low viscosity, such as a PFER value of 6 to 10, to facilitate high speed extrusion of the sealant or flow into joints of small width.

A still further object is to improve the surface quality and appearance of polyurethane caulking containing fibrous fillers or reinforcing material.

These and other objects, uses and advantages of the present invention will become apparent to those skilled in the art from the following drawings, descriptions and claims.

DEFINITIONS

Some of the terms used in the description and claims hereof are explained or defined below to facilitate an understanding of the terminology.

The terms "cold-applied" and "cold-cured" refer to application of the joint sealant and curing thereof without application of heat or at ambient temperature.

Unless the context shows otherwise, the term "polymer" covers both homopolymers and copolymers of two or more monomers.

The term "caulking composition" is applied to any joint sealing composition suitable for application through a caulking gun.

The term macrofibril is applied to fibrils with a diameter of 1 to 20 microns. The term microfibril applies to those fibrils having a diameter substantially less than 1 micron. A fibrillated polyolefin can contain both macrofibrils and microfibrils.

The term "aspect ratio" refers to the ratio of length to diameter or cross-sectional width. A "fibril" has an aspect ratio of at least 5 to 1 and is a type of fiber.

The term "ambient conditions" as applied to the joint sealant refers to exposure to the surrounding moisture-bearing air at ambient temperatures, such as 10° to 40° C.

The term "sweat out" refers to syneresis or exudation of liquid from a sealant mixture of a polyurethane polymer with a material that has reduced compatibility therewith, such as a fibrillated polyolefin. A "stabilizing cofiller" is a material that functions in combination with a fibrillated polyolefin to improve the compatibility and stabilize the sealant mixture so that sweat out is severely limited or prevented.

The surface area of fibrillated polyolefin in square meters per gram as set forth herein is determined by the standard BET method. The method of surface area measurement is the isothermal adsorption of nitrogen gas based on the BET equation. Other known methods may also be used to estimate the approximate surface area.

Unless the context shows otherwise, parts means parts by weight and all percentages are by weight.

This invention is concerned with non-sag low-modulus sealants which are elastomeric in nature and capable of cycling with building movement and returning to shape. The term "non-sag" as used herein indicates that the sealant has sufficient resistance to slump or sag to permit use in vertical joints.

The term "elastomeric" as applied to a joint sealant indicates an elongation of at least 100 percent.

The term "filler" is used herein in the normal sense to cover fillers for polyurethane compositions and includes pigments or coloring agents, such as titanium dioxide, carbon black and the like, which functions as a filler. Non-reinforcing fillers are preferred.

The term "whiting" as used herein means finely divided or pulverized chalk, limestone, marble or other calcium carbonate.

The term "micrometer" means micron and is one thousandth of a millimeter.

The Boeing sag test referred to herein conforms to ASTM Specification D 2200-73 and measures the ability of a joint sealant composition to retain shape when placed in a vertical receptacle called a flow test jig. The jig is of standard construction and is scaled in inches to measure the amount of slump or sag. The caulking compound or sealant is thoroughly mixed and placed in the jig cavity.

The Boeing sag value as referred to in the specification and claims hereof is the amount of sag or slump of the sealant composition in inches as indicated by the test jig after 15 minutes at room temperature (21° to 25° C.) The slump or sag should be no more than one or 25 millimeters for a commercial caulking composition and is preferably less than 0.9 inch.

The standard method for measuring the rate of extrusion of a joint sealant employs a press-flow extrusion rheometer (PFER) as set forth in ASTM Specification D 2452-75. The test is conducted at room temperature (21° to 25° C.) and basically involves extruding the viscous sealant through a small opening with a diameter of about one-tenth inch while applying a predetermined air pressure to the sealant and determining the weight of material extruded in a fixed period of time, such as 15 seconds. In this test, the greater the weight extruded, the lower the viscosity.

As used in the specification and claims, the term "PFER value" means the number of grams extruded in a 15-second period in accordance with the above test when using an air pressure of 50 pounds per square inch. For a commercial caulking composition the PFER value should be at least 2.4 grams per 15 seconds.

The Shore A durometer hardness referred to herein is the indentation hardness of a single- or multi-component joint sealant determined substantially in accordance with ASTM Specification C 661-70 and Federal Specifications TT-S-00227B and TT-A-00230C after curing the test specimen for 21 days.

The present invention can be applied to various types of joint sealants including those designated as ASTM Type II (one-component, moisture-cured), ASTM Type IV (two-component, catalyst cured) and ASTM Type V (two-component, OH or amine cured). With modern multicomponent sealants it is often difficult to distinguish between Type IV and Type V.

The abbreviations TDI and MDI are used herein to identify the various toluene diisocyanates and methylene diisocyanates, respectively. The term "crude" is applied to the undistilled grades.

DESCRIPTION OF THE PREFERRED EMBODIMENTS

The present invention is particularly concerned with cold-applied elastomeric-type polyurethane joint sealing compounds with superior non-sag properties suitable for application to concrete, glass, aluminum and other substrates in sealing, caulking and glazing operations and capable of being cured under ambient conditions to form a soft high quality elastomeric sealant or caulking. The joint sealing composition may employ conventional polyurethane polymers, plasticizers, plasticizer adducts, solvents, adhesion promoters, antioxidants, catalysts, curing agents, dispersants, pigments, and the like as disclosed, for example in U.S. Pat. Nos. 3,179,610; 3,372,083; 3,445,436 and 4,063,002. In accordance with the invention the composition also contains a fibrillated polyolefin as hereinafter described in combination with an effective compatible stabilizing cofiller capable of preventing sweat out or exudation of liquid.

The polyurethane polymers and the polyisocyanates and polyols or other polyfunctional compounds used to form them may be of conventional types as disclosed, for example, in the above-mentioned patents or any other type of polyurethane known to have elastomeric properties suitable for a sealant. It is preferable to employ polyurethane prepolymers having free isocyanate groups which can be cured at temperatures of 10° to 40° C. using moisture or a curing agent and/or catalyst. The invention applies to both single and multi-component sealants, but it is most convenient and advantageous to produce single-component moisture-curing joint sealants.

The fibrillated polyolefins used in the practice of this invention have a predominantly macrofibrillar structure and may be made from various olefinic monomers which may be polymerized or co-polymerized (e.g., in the presence of a coordination type catalyst or other catalyst) and then formed into a fibrous material. The preferred monomers are monoolefins with 2 to 6 carbon atoms per molecule, especially ethylene, propylene and mixtures thereof; but advantages of the invention can be obtained with diolefins having 2 to 6 carbon atoms, such as butadiene and isoprene; aliphatic alpha olefins having up to 18 and preferably 2 to 6 carbon atoms per molecule, such as 1-butene, 1-pentene, 1-dodecene and 4-methyl-pentene-1; and cycloalkyl and aryl-substituted olefins, such as vinyl cyclohexane and styrene. The fibrillated polyolefins employed in the joint sealants of this invention include not only homopolymers of the above described olefins but also fibrous copolymers and block copolymers formed by using mixtures of two or more of the foregoing olefins.

Various methods may be employed for forming the polyolefins described above into macrofibrils or microfibrils and for producing a fibrillated structure suitable for use in the practice of this invention. The fibrils may be treated, classified, chopped, micronized or otherwise physically treated to improve their suitability for use in a polyurethane joint sealant. Various commercial processes are known which can produce highly branched fibrillated polyolefins with a morphology similar to natural fibers. For example, U.S. Pat. No. 3,891,610 discloses a process whereby fibrillated polyolefins may be formed during polymerization of the olefin monomers, and U.S. Pat. No. 3,849,387 discloses a process wherein the monomers are polymerized to form a fibrous gel containing microfibrils and macrofibrils which can be mechanically refined to produce the desired polyolefin fibers.

The fibrillated polyolefins most suitable for use in the joint sealants of this invention are those which contain at least a major portion by weight and preferably at least 80 percent by weight of macrofibrils with a diameter from 1 to 20 microns. These macrofibrils have an aspect ratio from 20:1 to 100:1 or higher depending upon the process of manufacture. The molecular weight of the polyolefin is at least 100,000 preferably at least 200,000 and may be from 400,000 to several million or higher depending on the polymerization method and the type of monomers being polymerized.

Fibrillated polyolefins of this type can be made in accordance with well known processes disclosed in British Pat. Nos. 1,287,197, 1,388,881, 1,390,673, 1,398,623, 1,412,007 and 1,430,796 and U.S. Pat. Nos. 3,743,272, 3,848,027, 3,849,387, 3,882,095, 3,891,499, 3891,610, 3,902,957, 3,920,507, 3,920,508, 3,920,509. These patents of Crown Zellerback Corporation disclose the processes used during the last decade for manufacture of synthetic wood pulp fiber or SWP fiber which is used extensively in the paper industry to replace cellulose fiber. All of the processes disclosed in these patents for manufacture of macrofibrillar polyolefin can be adapted for and used for making fibrillated polyolefin material of a size and shape suitable for advantageous use in the joint sealants of this invention as will be apparent from the description which follows. Many of them involve surface treatment of the fibers with polyvinyl alcohol to improve wettability by water.

Fibrillated polyolefin material, such as SWP synthetic fiber, is suitable as a substitute for cellulose fiber but has poor compatibility with polymeric materials, such as polyurethanes. To improve the compatibility with a polyurethane, the polyolefin should be mixed with a compatible cofiller effective to stabilize the polyurethane sealant mixture and prevent substantial sweat out or exudation of liquid. Various fillers commonly used in polyurethane compositions are suitable for this purpose when used as the only cofiller or when used in conjunction with other fillers. The suitability of any cofiller can readily be determined especially after considering the specific compositions described herein.

The fillers and reinforcements used in the various types of plastics used in commerce are described in detail in the book "Handbook of Fillers and Reinforcements for Plastics" by H. S. Katz and J. V. Milewski, published in 1978 by Van Nostrand. Those used for polyurethane plastics are described in an earlier book "The Development and Use of Polyurethane Products" by E. N. Doyle, published in 1971 by McGraw-Hill.

Fibrillated polyolefins, such as SWP synthetic fiber, have been used extensively in the paper industry for more than a decade, but they are not mentioned in either of the aforesaid books. The 1978 Katz handbook describes in detail the types of conventional fibrous and nonfibrous fillers used prior to the present invention but omits mention of SWP fiber or any similar synthetic wood pulp fiber either as a filler or as reinforcement for plastics.

The 1971 Doyl publication lists the fillers and reinforcing for polyurethanes and includes natural and treated silica, talc, calcium silicates, Asbestine, kaolin, barium sulfate, graphite, hydrated alumina, pearlite, vermiculite, natural and synthetic mica, chrysotile, zirconium silicate, zirconium silicate, magnesium zirconium silicate, glass beads, glass flake, chopped fiberglass, mat fiberglass, nylon fiber, polyester fiber, alpha cellulose fiber and polypropylene fiber. The 1978 Katz handbook lists additional fillers useful in plastics including calcium carbonates, polyvinyl chloride, glass microballoons, Saran microballoons, carbon blacks, Wollastonite, PMF mineral fillers, solid spherical fillers, and the like. Generally the larger reinforcements are unsuitable for a joint sealing compound. Also the reinforcing fillers are undesirable in large amounts because of the requirement of a soft or low-modulus elastomeric sealant. Glass fibers and common synthetic fiber reinforcements made of nylon, polyester, polypropylene or the like are generally unsuitable for joint sealants.

The conventional fillers which are described in the 1971 Doyle publication and the 1978 Katz handbook and which can be used as a cofiller in the practice of the present invention include the various calcium carbonates, such as whiting, calcite, precipitated calcium carbonate, dolomite or the like; alumino silicates, such as kaolin; silica fillers, such as HiSil, Min U Sil, Cab-O Sil or the like, fibrous talcs; reinforcing and nonreinforcing carbon blacks; graphite; natural organic fillers; titanium dioxide; polyvinyl chloride; flake-type fillers; Wollastonite; and various micro and short fibers including PMF mineral fiber made by Jim Walter Resources, Inc. Other suitable cofillers include various hydrated magnesium silicates and substituted magnesium silicates such as amphiboles and minerals of the serpentine group ($H_4Mg_3Si_2O_9$) and substituted serpentines, wherein some of the magnesium is replaced with a metal, such as iron or aluminum. These include antigorite, lizardite, parachrysotile, orthochrysotile, chrysotile, marmolite, picrolite, iddingsite, garnierite and the like. Those of high surface area are generally preferred, but high-modulus fillers with reinforcing properties, such as fibrillar serpentine, should be used in limited amounts when seeking a low-modulus elastomer. Various fibrillar or acicular fillers of high surface area are suitable for use as the cofiller in the joint sealants of this invention, such as Wollastonite, PMF mineral fibers, chrysotile, crocidolite, acicular talc and the like. It is preferable to include a conventional non-fibrillar filler as part of the cofiller material used in the joint sealant of this invention and to select fillers and pigments which produce on acceptable color and also the desired combination of physical properties. Titanium dioxide, for example, is desirable as part of the cofiller not only because of color considerations but also to improve the quality of the sealant. Carbon black functions well as a cofiller but the dark color limits its use in caulking compositions.

The type of cofiller best suited for a joint sealant depends on the type of polyurethane and the method of curing. When making moisture-curing sealants, it is desirable to avoid substantial amounts of moisture in the fillers and other compounding ingredients. Fillers with minimum tendency to soak up moisture from the air are desirable. In this respect fibrillar serpentine or asbestos fibers of high surface area are undesirable. Fibrillated polyolefins on the other hand do not present a serious moisture problem and are very well suited for use in single-component moisture-cured joint sealants or caulking compounds.

The type and amount of cofillers best suited for any polyurethane joint sealant depends on a number of factors including the type of sealant, the types and amounts of compounding ingredients, the required flow properties, and the type of physical properties required in the cured product, especially the softness or durometer hardness and the tensile and elongation properties. For example, substantial amounts of fibrillar asbestos may be desirable if a Shore A durometer hardness of 45 to 55 is acceptable but would be un desirable if the desired durometer hardness for the sealant is below 35.

Generally the polyurethane joint sealants of this invention employ from 8 to 30 percent by weight of stabilizing cofiller and from 2 to 8 percent by weight of fibrillated polyolefin. The minimum amount of cofiller to stabilize the mix and prevent excessive sweat out, syneresis, or exudation of liquid depends on the type and amount of the polyolefin and the effectiveness of the cofiller.

Such effectivess may, for example, be determined by thoroughly mixing a conventional polyurethane prepolymer with 3 to 6 percent by weight of a fibrillated polyolefin, such as a fibrillated polyethylene, and with 20 to 25 percent by weight of the cofiller to be tested and then allowing the mixture to stand for a substantial period of time, such as 6 hours. If, after that time the exudation of liquid is insufficient to materially affect the surface quality and appearance of the cured elastomeric polyurethane, the cofiller is effective as a stabilizer and is a possible choice for use in a commerical joint sealant made according to this invention.

It is necessary to select a suitable combination of fillers and fibrillated polyolefin such that the sweat out or exudation of liquid will not materially affect the surface quality and appearance of the cured sealant, and the combination used in the sealant mixture is preferably such that, after the mixture stands for 10 hours at 25° C. the amount of exuded liquid is minimal and insufficient to thoroughly wet a piece of standard filter paper applied to the surface. A joint sealant composition according to this invention, after standing 12 hours at 25° C., preferably has so little exuded liquid that no free liquid is visible to the eye and a filter paper applied to and removed from the surface of the sealant material does not appear wet.

While a small amount of sweat out can theoretically be tolerated, for example where the sealant is mixed just prior to use, it is desirable to eliminate substantial sweat out by proper choice of the stabilizing cofiller and to avoid coarseness or defects in the surface of the cured joint sealant or caulking by use of a proper combination of polyolefin fibrils and cofiller material. Fox example, the sealant composition can be compounded so that the, uncured sealant mixture is essentially free of exuded liquid at the outer surface after standing for 10 hours at 250° C.

Of course, the type and amounts of cofiller must be selected to provide the uncured sealant with proper flow characteristics and also to provide a high quality cured product with the desired softness. A mixture of several fillers is usually best suited for producing optimum results, but a single cofiller can be used. Also it is usually desirable to include a number of different compounding ingredients including a plasticizer and an adhesion promoter. This also can affect the choice of cofiller.

The type of cofiller selected also depends on color considerations. Light colored fillers are often necessary and the amounts of darker fillers may have to be limited. Fillers, such as titanium dioxide and carbon black, are important as pigments. In a two component polyurethane sealant, Part A may be white and Part A may contain an amount of carbon black such that the mixed sealant has the desired gray color. The contrasting colors provide a visual mixing aid to assure thorough and uniform mixing.

The combination of a fibrillated polyolefin and a stabilizing cofiller enables the compounder to prepare various non-sag polyurethane joint sealants with excellent properties which heretofore could not be achieved. Many different formulations become available which would otherwise be impractical. For example, one polyurethane sealant according to this invention could employ 2 to 5 percent of a fibrillated polyolefin and 10 to 25 percent by weight of a stabilizing cofiller including up to 8 percent of titanium dioxide, up to 6 percent of fibrous talc or chrysotile, and up to 10 percent by weight of a third filler, such as calcium carbonate. Another sealant might employ 3 to 6 percent by weight of the fibrillated polyolefin and be free of other fibrillated fillers.

The present invention also gives the compounder a wide choice in the selection of polyurethane elastomers. A polyurethane sealant based on hydroxyl-terminated polydienes can be used for sealing double-pane insulating glass units. Also the fibrillated polyolefins are well suited for use in constant immersion joint sealants of the type used in swimming pools. The fibrillated polyolefin-cofiller combination of this invention, when used in a sealant of the type disclosed in U.S. Pat. No. 3,372,083, can produce a non-sag sealant with a Boeing sag value below 0.7 which cures to provide a strong soft low-modulus sealant with a Shore A durometer hardness of 40 to 45 or below. A comparable product with good adhesion to water-soaked concrete and suitable for constant immersion in swimming pool construction and like was not available prior to this invention and cannot be produced using processes disclosed in U.S. Pat. Nos. 3,445,436 and 4,059,549.

Figure 1:
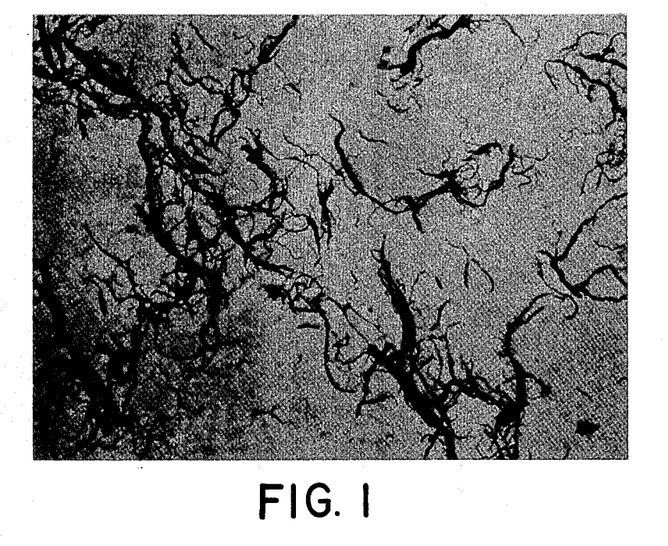
FIG. 1 is a magnified view of fibrillated polyethylene used in the joint sealants of the present invention.
Figure 2:
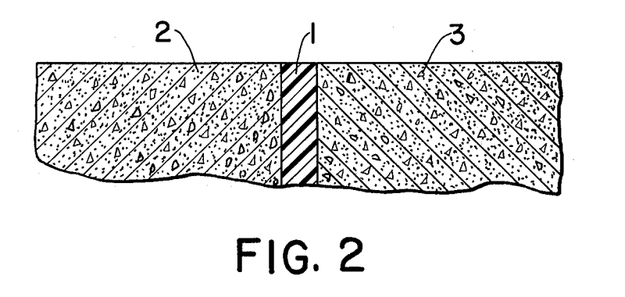
FIG. 2 is a fragmentary cross sectional view of a portion of a joint sealant between adjacent concrete panels.
Figure 3:
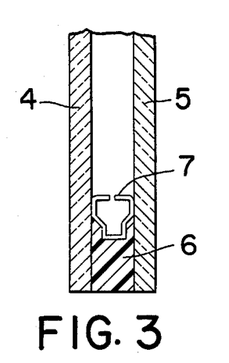
FIG. 3 is a fragmentary sectional view of a double-pane insulating glass unit employing a joint sealant according to the invention.
Figure 4:
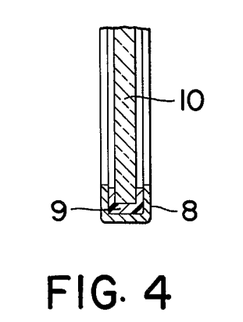
FIG. 4 is a sectional view of a portion of a window unit using the present sealant at the periphery of the glass pane.

FIGS. 2, 3 and 4 illustrate different applications of the joint sealant of this invention. FIG. 1 shows the urethane sealant 1 applied as a continuous joint between concrete blocks or panels 2 and 3, whch may form the outer portion of a building. The sealant may form a vertical joint with a width of 1 to 4 centimeters between flat rectangular concrete panels having a width of several feet.

FIG. 2 shows the urethane sealant 6 applied as a continuous joint between peripheral portions of flat glass panes 4 and 5 of a double-pane insulating glass unit. The unit may be of conventional construction with a metal channel 7 forming a rectangle at the periphery of rectangular panes 4 and 5 and spacing the panes to provide a peripheral channel to receive the sealant 6 which is preferably of the polydiene type described herein. The channel 7 may be filled with a dessicant.

FIG. 3 shows a single-pane window unit employing the sealant of this invention in a peripheral metal channel 8. As shown the sealant 9 is provided between the channel 8 and the glass pane 10 to seal the window at the periphery.

The polyurethane polymer used in the joint sealant of the present invention can be any polymer which can be cured at ambient temperatures to form an elastomer having a minimum elongation of at least 100 percent and preferably at least 150 percent.

The polyurethane polymer is a reaction product of an organic polyisocyanate having 2 or more isocyanate groups (preferably an aromatic or aliphatic diisocyanate) with a polyfunctional compound of substantial molecular weight having active hydrogen groups, such as phenolic or alcoholic hydroxyl groups, thiol groups, amine groups, carboxyl groups, or the like, which can react with the isocyanate groups to produce the desired elastomeric polyurethane. The polyisocyanate and the polyfunctional compound used to form the polyurethane polymer or prepolymer may be any of those disclosed in U.S. Pat. No. 3,372,083 or U.S. Pat. No. 4,063,002.

The polyisocyanate has 2, 3 or more functional or reactive isocyanate groups and is preferably an aromatic, aliphatic or aliphatic-aromatic compound including cycloaliphatic, aryl, aralkyl and alkary polyisocyanates. The diisocyanates are preferred to obtain the desired elastomeric properties, particularly when reacting the polyisocyanate with a triol or other polyfunctional compound with a functionality greater than 2. Examples of suitable organic polyisocyanates to use are aliphatic diisocyanates, such as ethylene diisocyanate, trimethylene diisocyanate, tetramethylene diisocyanate, hexamethylene diisocyanate, propylene-1,2-diisocyanate, butylene-1,2-diisocyanate, and butylene-2,3-diisocyanate; alkylidene diisocyanates, such as ethylidine diisocyanate and butylidine diisocyanate; cycloalkylene diisocyanates such as cyclopentylene-1,3-diisocyanate, and cyclohexylene-1,4-diisocyanate; cycloalkylidene diisocyanates, such as cyclopentylidene diisocyanate and cyclohexylidene diisocyanate; aromatic diisocyanates such as m-phenylene diisocyanate, p-phenylene diisocyanate, polymethylene polyphenylisocyanate, 2,4-tolylene diisocyanate, 2,6-tolylene diisocyanate, dianisidine diisocyanate, bitolylene diisocyanate, naphthalene-1,4-diisocyanate, and diphenylene-4,4'-diisocyanate; aliphatic-aromatic diisocyanates such as xylylene-1,3-diisocyanate, bis(4-isocyanatophenyl)methane, and 4,4'-diphenylpropane diisocyanate; durylene diisocyanate; naphthalene triisocyanate and the like. Mixtures of polyisocyanates can be used.

Commercial polyisocyanates which can be used include "Mondur MR" made by Mobay Chemical Company, "PAPI" made by The Carwin Company, (crude MDI), tolylene diisocyanate (TDI) and 4,4'-diphenylmethane diisocyanate (MDI). The preferred diisocyanates are TDI and MDI. The TDI is generally used in an 80:20 blend of the 2,4 and 2.6 isomers. A preferred class of diisocyanates has the general formula where R is selected from the group consisting of hydrogen, methyl, ethyl, propyl, isopropyl, butyl, amyl, hexyl and the lower alkyl radicals. Other preferred isocyanates are MDI, crude MDI (e.g. PAPI), and polyarylene polyisocyanates, such as Mondur MR.

When making a polyurethane prepolymer, sufficient organic polyisocyanate is employed both to react with all of the active hydrogen groups (e.g, hydroxyl, thiol, amino and/or carboxyl groups) of the polyol or other polyfunctional compound and to provide an isocyanate-terminated polyurethane prepolymer having the desired percentage by weight of free isocyanate (NCO available for reaction) based on the weight of the prepolymer (for example, a free NCO content of 1 to 5 percent).

Any polyfunctional compound containing a plurality of hydroxyl groups or other active hydrogen groups (e.g., thiol, amino or carboxyl groups) can be used for reacting with the organic polyisocyanate to produce the polyurethane polymer or prepolymer used in the practice of this invention. The polyfunctional compound preferably has a functionality from 2 to 3 and may be a hydroxyl-terminated epoxy compound, a polyester, a polyalkylene ether, a polyalkylene thioether, a diene polymer or other compound which will react with a diisocyanate to produce the desired type of elastomeric polyurethane. For example, the polyfunctional compound may be selected from polyether polyols, polyester polyols, polyetherester polyols, polyesteramide polyols, fatty acid glycerides, OH-terminated epoxies, OH-terminated diene polymers, mixtures thereof, and the like.

Various polyfunctional polyesters or polyester polyols can be employed to form the polyurethane polymers or preplymers used in the practice of this invention. The polyesters preferably comprise the reaction product of a polycarboxylic acid or anhydride thereof and a polyhydric alcohol. A molar excess of an alcohol or glycol is used to obtain a polyester with terminal hydroxyl groups. The acid may be selected from adipic, succinic, azelaic, pimelic, suberic, phthalic, maleic, itaconic, and sebacic acids or mixtures thereof. Acid anhydrides and dimer acids can also be used. Aliphatic dicarboxylic acids with 4 to 10 carbon atoms are preferred for making linear polyesters. The polyhydric alcohol may, for example, be ethylene glycol, diethylene glycol, propylene glycol, butylene glycol, 1,6-hexanediol, pentaerythritol, 1,4-butanediol, 1,8-octanediol or the like. Glycols with 4 to 10 carbon atoms are preferred for making linear polyesters.

In making the polyesters, mixtures of dibasic acids and anhydrides may be used as well as mixtures of different glycols or alcohols. Polyesters can also be made by transesterification and other processes. Mixtures of hydroxyl-terminated polyesters or other polyfunctional polyesters may be employed in making the polyurethane polymer or prepolymer.

Where branch chain polyesters are desired, they may be obtained by reaction of polyols, such as glycerol, hexanetriol, pentaerythritol, and the like, with dicarboxylic and/or other polycarboxylic acids (such as trimellitic acid, trimesitinic acid, ethylene dimalonic acid or the like) as disclosed in U.S. Pat. No. 3,372,083.

The polyester can also be made with minor amounts of other compounds, such as ethylene diamine or other diamines or ethanolamine or other amino alcohols, for example, to provide the polyester with a minor amount of amide linkages, a preponderance of ester linkages and amine termination.

Other compounds which can be reacted with the organic polyisocyanates to produce the polyurethane prepolymer include alkyd resins and fatty acid glycerides, such as castor oil or glycerides of ricinoleic acid or other fatty acids, castor oil polyols, and similar polyols obtained by transesterification. This includes mono-, di- and triglycerides. Transesterification (alcoholysis) of castor oil with glycerol and other polyols can produce various castor oil polyols or derivatives useful in forming the polyurethane polymers. Other polyols or glycerides which can be used for reaction with the organic diisocyanate or for producing useful polyfunctional compounds can be obtained by transesterification of drying oils, such as linseed or soya oils.

Suitable polyols for making the polyurethane prepolymers include the above glycerides as well as polyether polyols, polyester polyols, polyetherester polyols, polyesteramide polyols or mixtures thereof as disclosed, for example, in U.S. Pat. No. 3,372,083.

Generally it is preferred that such polyols when used contain at least 3 carbon atoms in the molecular chain between ether, ester or esteramide linkages, be saturated, and contain primary or secondary OH termination, more preferably primary OH termination. The polyesters and polyethers may be mixed or may be reacted to form a composite polyether-ester polyol as disclosed in said last-named patent.

Many different polyfunctional polyethers or polyether polyols may be employed to form the polyurethane polymers or prepolymers as disclosed, for example, in the latter patent. These may be obtained from alkylene oxides, such as ethylene oxide or propylene oxide, substituted oxetanes, glycols, heterocyclic ethers and other materials by polymerization, copolymerization and other reactions and may have terminal reactive groups such as hydroxyl, thiol, amine or carboxyl groups. For example, tetrahydrofuran may be polymerized in the presence of a catalyst, such as fluorosulfonic acid, to make polytetramethylene ether glycols of various molecular weights. Various other methods of polymerizing glycols are well known and are disclosed in said patent.

The polyether polyols or polyalkylene ether polyalcohols are preferred, and these include polyethlene glycols, polypropylene glycols, polyhexamethylene ether glycols and the like. Other suitable glycols include polyoxypropylene-polyoxyethylene glycols (block polymers) with a molecular weight from 1000 to 3000 or higher which are sold under the trademark "PLURONIC".

Branch chain polyethers or polyether polyalcohols or other polyfunctional polyethers suitable for use in the present invention may be made by reacting glycols or alkylene oxides or mixtures thereof with polyhydric alcohols, polyfunctional amines, and other compounds as set forth below, in the presence of suitable catalysts, if desired. The polyhydric alcohols are preferably glycols or trihydric alcohols. The alcohols or hydroxyl-containing compounds suitable for the above reactions include sucrose, sorbitol, hexanetriol, pentaerythritol, phloroglucinol, trimethylol phenol, trimethylol benzene, trimethylol propane, styrene-vinyl alcohol copolymers, glycerine, ethylene glycol, propylene glycol, butylene glycol, butane diols, propane diol, hexane diols, or the like and mixtures thereof. The polyfunctional amines for the above reactions may be a diamine, such as ethylene diamine; an amino alochol, such as ethanolamine; a triamine, such as diethylene triamine;

or the like mixtures of different amines. The polyhydric alcohols or polyfunctional amines can be reacted with ethylene oxide, propylene oxide or mixtures thereof to produce polyethers of various molecular weights. Where branched chains are desired, compounds with a functionality greater than 2 can be used, such as trimethylol propane or a triamine.

A number of polyether triols were specifically developed for urethane applications. These consist generally of ethylene oxide or propylene oxide adducts of polyhydric alcohols, such as glycerol, hexanetriol, trimethylol propane, pentaerythritol, sorbitol and others having molecular weights from 300 to 5000. Tetrols can also be employed. Various block polymers can be used, such as polyoxypropylene-polyoxyethylene adducts of ethylenediamine.

Various polyhydric polyalkylene thioethers can also be used in making the polyurethane polymers. These can be prepared by reacting alkylene oxides such as propylene oxide or ethylene oxide with a polyhydric thioether, such as thiodiglycol or 3,3'-dihydroxypropyl sulfide.

It will be apparent that advantages of the present invention can be obtained when using graft polymers, block polymers and other modified polymers with characteristics similar to the more common polymers. Various polymer mixtures and polymer combinations can be used. Block urethane polymers of various types can, for example, be made using a process of the general type disclosed in U.S. Pat. No. 3,078,239.

As indicated in U.S. Pat. No. 3,372,083, it is desirable in some polyurethane prepolymer formulations to use chain extenders and/or crosslinking materials to provide the desired physical properties. These can contain from 2 to 6 or more reactive OH groups and sometimes can be used in relatively small amounts such as 0.1 to 2 percent by weight based on the weight of the final prepolymer. As indicated in the patent, a large number of different materials can be used for this purpose including trimethylol propane, pentaerythritol, ethylene diamine, reaction products of propylene oxide and glycerol or hexane triol, mercaptans, and other common crosslinkers or chain extenders.

The joint sealant compositions of the present invention employ liquid or viscous polyurethane prepolymers which can be cured at ambient temperatures or temperatures below 50° C. to produce elastomeric sealants. Scuh prepolymers may have terminal epoxy groups cured with primary amine curing agents as disclosed, for example, U.S. Pat. No. 3,445,436 (e.g. diepoxy-terminated polyethers are sold under the trademark DYMERIC) or may have other terminal reactive groups which permit curing of the liquid prepolymer to the elastomeric state. However, it is preferable to employ liquid prepolymers having terminal isocyanate groups and to effect curing with water or a suitable curing agent, such as a polyol or polyamine.

An isocyanate-terminated polyurethane prepolymer is prepared by reacting a molar excess of organic polyisocyanate, such as an aliphatic or aromatic diisocyanate, with a suitable polyfunctional compound as previously described having active hydrogen groups, such as hydroxyl, amino, thiol or carboxyl groups sufficient organic polyisocyanate is employed both to react with all of the active hydrogen groups of the polyol or polyfunctional compound and to provide from 0.5 to 10 percent by weight of free isocyanate based on the weight of the prepolymer. The available NCO is preferably from about 1 to about 8 percent and usually 1.5 to 5 percent for moisture-cured joint sealants or caulking compounds. The polyurethane prepolymers are selected to provide the joint sealing composition with flow characteristics suitable for application to a joint preferably by a caulking gun. The average molecular weight of the polyurethane prepolymer can be from 1000 to 30,000 or higher and is preferably from about 1,500 to about 20,000. The heavier prepolymers may require a solvent to obtain the necessary flow characteristics. For caulking compositions the average molecular weight of the prepolymer is usually from 2,000 to 10,000.

The prepolymers can be prepared by various procedures well known to the art. For example, they can be reacted in an environment or under an atmosphere free of water vapor or other material reactive with isocyanate groups. Dry nitrogen is the most convenient but a vacuum can be used. The NCO/OH ratio may be from 1.1:1 to 2:1 and is usually 1.2:1 or higher. Temperatures and reaction times will vary, but the temperatures are usually below 150° C. Various catalysts and solvents and other additives, such as benzoyl chloride may be added to obtain the desired polyurethane forming reaction as disclosed in said U.S. Pat. No. 3,372,083. The catalysts may, for example, be conventional tertiary amines or organometallic catalysts such as triethylamine, triethylenediamine, N-methyl morpholine, stannous octoate or the like or tetravalent tin compounds, such as dibutyl tin dilaurate.

While the polyurethane prepolymers can be formed from various amines, mercaptans or carboxyl-terminated compounds, commercial prepolymers are preferably formed from high molecular weight triols or a combination of diols and triols so that the average OH functionality of the polyols is greater than 2.2 and more preferably 2.3 or above. The organic diisocyanate or polyisocyanate can for example, be reacted with a polyol material selected from the group consisting of polyether triols, polyester triols and combinatations of the foregoing with polyether diols or polyester diols. The polyols preferably have an average molecular weight of from about 2000 to about 8000 and more preferably 4000 to 7000. The average OH-functionality is preferably from about 2.3 to about 2.8, and the average molecular weight of the isocyanate-terminated polyurethane prepolymer prepared from the polyols is preferably 2000 to 10,000 but can be much higher. The triol preferably has an average molecular weight of from 3,000 to 8,000.

The organic diisocyanate or polyisocyanate is preferably reacted with the triol to provide a trifunctional polyurethane before the diol is added. The diol then serves as a chain extender or crosslinker. The final prepolymer can have a free or available NCO content of 1 to 10 percent or higher, but the toxic nature of organic isocyanates makes it desirable to limit the NCO content. In a moisture curing joint sealant, the NCO content will be chosen to permit the desired rate of cure at ambient temperature and normal atmospheric conditions (e.g., with a relative humidity of 40 to 50 percent). The diol, triol, polyisocyanate, and catalyst, if any, and the amounts of the reactants and the reaction conditions are chosen to provide an isocyanate terminated prepolymer which has the desired rate of cure in the sealing composition and has adequate stability for storing. The rate of cure may be above or below normal, but normal rates of cure are usually preferred. For example, in a moisture-cured caulking composition it may take 6 to 8 hours for the sealant to lose its tackiness and 2 to 3 days or so for the sealant to cure. The most desirable cure rate depends, of course, on many factors including the desired shelf life of the sealant, the desired tensile and elongation properties and so forth.

Single-component and multi-component joint sealants made according to this invention may employ one or more polyurethane prepolymers. In some sealants a twin prepolymer system can be used such as a variation of the ASTM Type V urethane or a combination of ASTM Type IV and ASTM Type V.

It will be understood that the joint sealing compositions of the present invention may incorporate any of the compounding ingredients commonly used in commercial urethane joint sealants and caulking compounds including various crosslinking agents, chain extenders, catalysts, antioxidants, ultraviolet absorbers, solvents, plasticizers, extenders, adhesion promoters, dispersing agents, surfactants, inhibitors and other additives. A variety of different types of plasticizing materials and mixtures of said materials can be used. High molecular weight resinous and polymeric materials are preferred, such as coal tars, asphalts, polybutenes, chlorinated paraffins, coumarone-indene resins and other plasticizing resins, and adducts or modified forms of such materials as disclosed for example, in U.S. Pat. Nos. 3,372,083 and 4,063,002. When the joint sealant of this invention incorporates a compatible plasticizer, the plasticizer is preferably one of the types disclosed in those patents.

A typical non-sag elastomeric-type sealant or caulking composition made according to this invention comprises from 30 to 70 percent and preferably 30 to 50 percent by weight of a curable polyurethane prepolymer with terminal isocyanate groups and/or other reactive groups, up to 45 and preferably at least 20 percent by weight of a viscous organic plasticizer compatible with the prepolymer, up to 2.5 percent by weight of an adhesion promoter, 2 to 8 percent by weight of a fibrillated polyolefin with a suitable macrofibrillar structure and a high surface area, such as 10 to 30 square meters per gram, and 8 to 30 percent by weight of a compatible stabilizing cofiller. The uncured sealant when applied should have a Boeing sag value below 0.9 and a PFER value above 2 and preferably above 2.5 when cured should provide a strong soft durable low-modulus elastomeric sealant with an elongation in excess of 100 percent and a Shore A durometer hardness of from about 20 to about 45, preferably no more than 40. The elongation is preferably at least 150 percent and more preferably 200 percent or more, and good tear resistance and weathering properties should also be provided.

The present invention makes it much easier for the formulator to obtain desirable flow properties and non-sag characteristics while at the same time producing a low modulus sealant of the desired softness. Because of the versatility provided by this invention, it becomes possible to achieve unique combinations which heretofore were not provided in commercial urethane sealants. For example, a low-modulus elastomeric sealant with a Shore A durometer hardness of 20 to 40 can be obtained from a urethane composition having a Boeing sag value of 0.9 or less and a PFER value of 5 or more. A similar type of sealant compounded somewhat differently can achieve a Shore A durometer hardness of 40 or below with a composition having a PFER value of 2.5 or above and a relatively low Boeing sag value, such as 0.1 to 0.2 or below. The latter composition would be excellent for wide vertical joints, such as those having a width of 3 to 8 centimeters or more, which were heretofore too wide for known low-modulus polyurethane joint sealants.

The above discussion applies to multicomponent sealants as well as one-component sealants. The Boeing sag values and PFER values referred to above apply to the two-component sealant mixture after the A and B components are mixed together.

While adhesion promoters are not essential to obtain adhesion of the joint sealant to a concrete substrate or other substrate when a suitable primer is applied prior to application of the sealant, it is usually preferable to incorporate a small amount, such as 0.5 to 2.5 percent by weight, of a silane coupling agent or other adhesion promoter to obtain the desired adhesion to glass, metallic or cementitious substrates. For example, adhesion to such substrates is greatly improved when using silane coupling agents having 2 to 3 alkoxy groups or hydroxy groups and from 1 to 2 organic groups terminated with functional groups, such as amino, epoxy or isocyanate groups.

The polyurethane sealants of the present invention, particularly the single-component moisture-curing caulking composition made in the manner described, have many advantages which make them superior to any other commercial non-sag joint sealant known prior to this invention. To facilitate comparison, the characteristics of the commercial non-sag caulking compositions are set forth in Table I, in which A indicates silicone sealants; B indicates sealants of the type disclosed in U.S. Pat. No. 4,059,549 using polyvinyl chloride as a filler; C indicates sealants of the type disclosed in U.S. Pat. No. 3,445,436; D indicates sealants of the type disclosed in U.S. Pat. No. 3,372,083; and E indicates the non-sag sealants of the present invention.

TABLE I

|  | A | B | C | D | E |
|---|---|---|---|---|---|
| Single component | Yes | Yes | No | Yes | Yes |
| Package stability | Yes | No | Yes | Yes | Yes |
| Low modulus | Yes | Yes | Yes | No | Yes |
| Ease of manufacture | No | No | Yes | Yes | Yes |
| Class A rating | Yes | Yes | Yes | No | Yes |
| Good adhesion to wet concrete | Yes | No | No | Yes | Yes |
| Tendency to collect dirt | Yes | No | No | No | No |
| Good tear resistance | No | Yes | Yes | Yes | Yes |
| Energy wasteful | Yes | No | No | No | No |

When considering the cost and other factors, the polyurethane caulking composition of this invention is much better than any silicone sealant. As indicated in Table I, it is also far superior to the polyurethane compositions B, C and D. It should be noted that the compositions D and E are well suited for use in swimming pools or other applications requiring good adhesion to water-soaked concrete, whereas the polyurethane compositions B and C are clearly unsuitable for such use. The composition D does not have the softness and low durometer needed for joints subject to substantial cycling movement, and its elongation tends to be borderline (e.g., 100 to 120 percent or below) after ageing. The composition E, on the other hand, retains good elastic properties and can easily be provided with an elongation 200 percent or more even when the Shore A durometer hardness is as high as 40.

The composition E set forth in Table I employs a common urethane prepolymer with terminal NCO groups, but other prepolymers can be used in the practice of this invention. For example, such NCO-terminated prepolymer can be modified by reacting some or all of the isocyanate groups of the polyurethane prepolymer with a monohydroxy aliphatic monoepoxide, such as a 2-alkyl glycidol, to provide terminal epoxy groups on the prepolymer.

Isocyanate-terminated polyester or polyether urethane prepolymers of the type previously described can be reacted with a hydroxy aliphatic epoxide, such as glycidol or a 2-alkyl glycidol having 1 to 4 carbon atoms in the alkyl group or any other suitable organic compound having a hydroxyl group and an epoxide group, to produce a curable liquid epoxyterminated prepolymer of the type disclosed in U.S. Pat. No. 3,445,436. The liquid prepolymer can be advantageously capped with an alkanol, such as methanol or ethanol, and provided with a functionality greater than 2 as in said patent so that it can be cured to provide the desired elastomeric sealant. Curing can be effected using a conventional curing agent for epoxies selected from organic polyamines, polyamide polyamines, organic acids, organic acid anhydrides, and mixtures thereof. Suitable curing agents are described in said U.S. Pat. No. 3,445,436 and include polyamines, such as triethylene tetramine and propylene diamine, and acids or anhydrides, such as azelaic acid and dodecyl succinic anhydride.

For special applications, the properties of polyurethane sealants may be improved by using polymers with special characteristics. In waterproof coatings, for example, the polyurethane elastomer should have a low permeability and low moisture vapor transmission (MVT) rate as are provided by polyalkadienes, such as polybutadiene. As stated in the book "The Development and Use of Polyurethane Products" by E. N. Doyle (1971) "When the formulator wishes to incorporate the properties which the polybutadienes will impart to the polymer, the best method is to utilize them as the hydrogen donor in the NCO-terminated prepolymer. They show excellent compatibility with the aromatic diisocyanates with which they form very clear, stable prepolymers at an NCO percentage. When subsequently reacted with the remaining hydrogen donors to form the polymer, there is no incompatibility with any component."

For more than a decade, the hydroxyl-terminated polydienes have been used to prepare elastomeric polyurethanes with waterproofing compounds and the like. During this time the principal supplier was Arco Chemical Company which sold a family of liquid hydroxyl-terminated homopolymers and copolymers of budadiene under the trademark "poly bd.". The Poly bd liquid resins are used to prepare polyurethane prepolymers with a low MVT rate for special applications, for example in waterproof walk and traffic deck coatings, pourable joint sealers, between-slab waterproofing membranes, and the like. Polyurethane compositions of this type, when applied between concrete slabs by brushing or spraying provide an impermeable waterproofing membrane of superior quality.

A conventional between-slab waterproofing membrane can be made, for example, from a composition using 30 to 40 percent by weight of a hydroxyl-terminated polybutadiene, such as Poly bd R-45 or Poly bd R-45HT, 30 to 50 percent or more of an asphalt of bituminous plasticizer, and other compounding ingredients including an organic diisocyanate and a diol, such as Pluracol 245 or Isonol C-100.

It has been common for many years to use a combination of diols and triols to chain extend a Poly bd prepolymer, such as one prepared by reacting Arco's R-45HT polymer with MDI or TDI. For example, it is common practice to cure such NCO-terminated prepolymer with short chain triols, such as Pluracol Tp-340 or Pluracol TP-440., or combinations thereof with short chain diols such as Isonol C-100, to produce elastomeric polyurethanes with superior waterproofing properties. The fibrillated polyolefin-cofiller combination of the present invention is particularly well suited for use with polyurethanes of this type to produce versatile non-sag coatings and joint sealants. Except for the unique polyolefin-cofiller combination, the compounding of the waterproof composition from Arco's Poly bd resins may be substantially as practiced for many years prior to this invention.

In a conventional two-component cold-applied ambient-cured elastomeric-type waterproofing polyurethane composition, Part A may consist of 100 parts by weight of a hydroxyl-terminated polydiene, such as Poly bd R-45HT; 20 to 25 parts of a diol, such as Isonol C-100; 50 or more parts of a bituminous plasticizer, such as an asphalt or asphalt adduct (see U.S. Pat. No. 3,372,083); and other compounding ingredients, such as fillers, solvents, plasticizers, dispersants and catalysts. Part B may consist of an aromatic diisocyanate, such as MDI or TDI, and a plasticizer or filler. An organometallic catalyst, such as lead octoate, stannous octoate or dibutyl tin dilaurate, may be employed in Part A or in Part B. Excellent results are obtained when a conventional polyurethane composition of this type is modified by replacing the fillers with a combination of fibrillated polyolefin and stabilizing cofiller. Adhesion of the material to a substrate may be improved by use of a primer or by incorporating conventional adhesion promoters in the composition.

If the polyurethane composition is to be adhered to glass, a conventional silane coupling agent may be employed as the adhesion promoter. The present invention makes it possible to produce joint sealants with exceptional non-sag properties which are particularly useful in the manufacture of double-pane insulating glass units, such as the unit of FIG. 3, and which can readily be applied around the periphery of such a unit by a caulking gun or other applicator.

The preferred non-sag joint sealants of this invention for use in insulating glass units comprise from about 25 to about 45 weight percent of the polymeric constituent, from about 25 to about 50 weight percent of plasticizing material, and from about 20 to 35 weight percent of filler (including the fibrillated polyolefin). The polyurethanes used as the polymeric constituent preferably have a butadiene backbone and are preferably combined with high molecular weight plasticizers, as disclosed herein or as disclosed in U.S. Pat. No. 4,063,002, to produce a joint sealant with the properties needed for a high quality insulating glass unit including high elongation, low volatility and excellent adhesion to glass.

An excellent two-component polyurethane glazing composition for use in insulating glass units may be prepared as indicated in the examples which follow using a prepolymer of Poly bd R-45HT and a crude MDI (PAPI) with from about 3 to about 4 percent available NCO in the Part A component together with fibrillated polyethylene and carbon black and using titanium dioxide, Isonol C-100 or other diol, and dibutyl tin dilaurate or other catalyst in the Part B component. The present invention makes it easy for the formulator to produce polyurethane joint sealants for insulating glass units with very low MVT rates, excellent weathering properties and exceptional non-sag properties which could not be obtained from compositions known prior to this invention and cannot be obtained from compositions of the type disclosed in U.S. Pat. No. 4,063,002.

The diene polymers than can be used in the practice of this invention have hydroxyl groups or other functional groups than can react with an organic diisocyanate, and the dienes which are preferably employed to make the aforementioned polymers are unsubstituted, 2-substituted or 2,3-disubstituted, 1,3-dienes or up to 12 carbon atoms. Excellent results can be obtained using OH-terminated homopolymers and copolymers of butadiene with molecular weights from 2000 to 4000, particularly Arco's liquid Poly bd resins, such as the butadiene homopolymers (R45M and R-45HT), the styrenebutadiene copolymer (CS-15), and the acrylonitrile-butadiene copolymer (CN-15). Mixtures of these can be used. The Poly bd liquid resins have a microstructure that is usually about 60 percent trans-1,4 and about 20 percent cis-1,4.

The examples presented hereinafter include special waterproof sealants employing polyurethane prepolymers made from Poly bd resins, but most of the examples are concerned with sealants of general utility using a simple polyether urethane prepolymer.

General purpose non-sag moisture-cured polyurethane caulking compositions made according to this invention or as in the examples which follow are far superior to conventional caulking compositions and can easily exceed the requirements of Federal Specification TT-S-00230C for a Class A rating. For example, a conventional moisture-cured sealant as disclosed in U.S. Pat. No. 3,372,083 cannot meet such requirements and is unsatisfactory for joints subject to substantial cyclic movement because, after weathering for several months, the elongation is inadequate (e.g., 100 to 120 percent).

This is shown by an accelerated ageing test wherein the cured sealant is heated at 70° C. for 7 days. In this test the elongation of the conventional sealant drops considerably as it is aged (e.g. from over 170 percent to less than 120 percent), but the sealant of this invention retains high elongation properties. This invention makes it easy to produce commercial one-component moisture-curing non-sag urethane caulking compounds which retain an elongation of 180 to 250 percent after extended ageing.

The durability of moisture-curing caulking compounds made according to this invention can be shown by testing in accordance with ASTM Specification C 719-72, which is an accelerated procedure for evaluating the performance of a sealant under cyclic movement using an automatic compression-extension machine to compress and extend the cured test specimen at a rate of ⅛ inch per hour.

The sealants of this invention are exceptionally well suited to use in moving joints because of their ability to maintain a bond to the substrate under severe conditions. This can readily be shown by a standard adhesion-in-peel test conforming to ASTM Specification C 794-75. The test specimens contain an embedded cloth which is peeled back from the substrate at 180 degrees by a tension-testing machine to cause a cohesive and/or adhesive failure. A cohesive failure is what is sought in which the sealant itself fails rather than the adhesive bond. The joint sealants of this invention adhere extremely well to concrete, metal and glass substrates and can readily be compounded so that the failure in the above peel test is almost entirely cohesive failure rather than adhesive failure even when the Shore A durometer hardness of the cured adhesive is as high as 40. Substantial advantages of the present invention can be obtained even when such durometer hardness is above 50.

The advantages referred to above can be obtained when employing a variety of different fibrillated polyolefins and different cofillers. The polyolefins to be employed in commercial joint sealants or in the sealants of the examples which follow are preferably high-density or low-density polyethylene or isotactic polypropylene with molecular weights above 200,000 and more preferably above 400,000. The polymerization of the monoolefin may be effected using various conventional procedures known in the art such as those disclosed in the patents of Crown Zellerbach Corporation referred to previously.

For example, a suitable reaction medium for the polymerization is one in which the polyolefin to be formed is swellable or soluble. The polymerization reaction medium or solvent may be cyclohexane, decalin, p-xylene, heptane, hexane or the like. The catalyst for the reaction may be a Ziegler-typecoordination catalyst system employing a catalyst, such as titanium trichloride, titanium tetrachloride, vanadium tetrachloride or vanadium oxytrichloride, in combination with a cocatalyst such as dialkyl aluminum halides and trialkyl aluminum compounds.

The pressure employed in the polymerization reactor may be any pressure up to 10 atmospheres or higher conventionally used for the particular monoolefin to be polymerized and the coordination catalyst used. The temperature is not critical but must be below the melt dissolution temperature and is preferably between 20° C. and 80° C.

Polyolefin fibers with a macrofibrillar structure suitable for use in the joint sealants of this invention may be formed in various ways as disclosed in U.S. Pat. Nos. 3,743,272; 3,849,387; 3,891,610; 3,902,957; 3,920,507; 4,020,266 and other Crown Zellerbach patents previously mentioned. Formation of the fibrillar polyolefin may be effected by subjecting the polymer to a shear stress or passing it from a zone of high pressure to a zone of lower pressure as disclosed in said patents. The condition should be selected to form a high proportion of macrofibrils with a diameter or cross-sectional width from 1 to 10 micrometers (microns) and an aspect ratio greater than 30 to 1. It is preferable to obtain a higher branched macrofibrillar structure similar to that shown in FIG. 1 and a surface area (BET) of from 5 to 50 square meters per gram.

The solvent-containing polyolefin fibers are preferably treated with polyvinyl alcohol to improve water dispersibility as disclosed, for example, in U.S. Pat. No. 3,848,027. The fibers are preferably fluff dried by passing hot air through the fibers to separate the fibers as they dry and prevent agglomeration or clustering.

It is extremely important to obtain a fibrillar polyolefin of a suitable size. The average length of the fibrils preferably does not exceed 1 millimeter, but a small proportion may have lengths up to 1.5 millimeter. It is best to avoid fibrils having a length in excess of 1.2 millimeters because the longer fibrils produce a sealant with an unacceptable coarse surface.

In order to obtain a polyolefin with fibrils of acceptable size and surface area, the fibers can be chopped, micronized, classified or otherwise mechanically refined. For example, excellent results can be obtained using predominantly crystalline fibrillar polyethylene or polypropylene with a high molecular weight, such as 400,000 to 1 million, with a fibril diameter from 4 to 10 microns, an average aspect ratio from 30:1 to 100:1 and a surface area from 10 to 30 microns. The examples which follow will serve to illustrate the present invention and the nature of the problem solved by that invention.

EXAMPLE I

To 3.1 moles of TDI (an 80/20 blend of 2.4- and 2,6-tolylene diisocyanates in all of the examples) there was added slowly in a closed reactor, under an atmosphere by dry nitrogen and under good agitation, one mole of "PLURACOL 220", a polyether triol made by BASF Wyandotte Corporation capped with ethylene oxide and having an equivablent weight of about 2075, a hydroxyl number of about 26.7, an apparent pH of about 6.8, and a water content below 0.03 percent. The mixture was held for about three hours at a temperature of about 82 to 83° C. while agitating it with a mixing blade to obtain a liquid prepolymer having a viscosity at 25° C. of about 2500 to 3500 centipoises. This prepolymer, hereinafter referred to as "X-100", has a free NCO content of about 2 percent.

To 94 percent by weight of the prepolymer prepared as above, there was added about 6 percent by weight of dry fibrillated polyethylene having a specific gravity of about 0.9, a moisture content less than 2 percent, an average fiber length of about 0.75 millimeters, a diameter of about 10 micrometers (microns), and a surface area (BET) of 9 to 15 square meters per gram. The prepolymer and polyethylene fibers were thoroughly mixed for about 10 minutes in a moisture-free oxygen-free environment until the fibers were dispersed in the prepolymer to form a viscous moisture-curing caulking composition suitable for testing (hereinafter referred to as "Test Composition A").

The Composition A is conveniently mixed in the laboratory in a dry nitrogen atmosphere and then degassed for about one-half hour under a high vacuum, but the mixing is preferably carried out under a vacuum.

EXAMPLE II

To 85.7 percent by weight of the prepolymer X-100 prepared as in Example I, there was added about 4.8 percent by weight of xylol and about 9.5 percent by weight of the fibrillated polyethylene of Example I. These were mixed using the same procedure as in Example I to produce Test Composition B.

EXAMPLE III

To 87 percent by weight of the prepolymer X-100 there was added about 5 percent by weight of the fibrillated polyethylene of Example I and about 8 percent by weight of natural sepentine filler comprising a major portion by weight of lizardite, a minor portion by weight of antigorite, and trace amounts of chrysotile fibers having an average fiber length from 2 to 3 microns. The serpentine filler was dispersed in the prepolymer by agitating and mixing the composition for about 10 minutes as in the previous examples to produce Test Composition C which, unlike the previous examples, had the properties needed for an acceptable caulking composition as indicated in Table II which follows.

EXAMPLE IV

A Test Composition D was prepared from the same materials as in Example III using the same mixing procedure but with a larger amount of the natural serpentine filler. In this example about 75 percent by weight of the prepolymer X-100 was mixed with 5 percent by weight of the fibrillated polyethylene of Example I and about 20 percent by weight of the serpentine filler.

EXAMPLE V

A Test Composition E was prepared according to the procedure of Example IV except that 60 percent by weight of the prepolymer X-100 was mixed with about 5 percent by weight of the fibrillated polyethylene of Example I and about 35 percent by weight of the serpentine filler.

EXAMPLE VI

To 75 percent by weight of the prepolymer X-100 of Example I there was added about 5 percent by weight of ground marble (calcium carbonate) and about 20 percent by weight of the natural serpentine filler of Examples III to V. The materials were thoroughly mixed for at least 10 minutes using the procedure of Example I to effect dispersion of the fibers and to provide a Test Composition F suitable for testing.

EXAMPLE VII

To 87 percent by weight of the prepolymer X-100 there was added about 8 percent by weight of ground marble and about 5 percent by weight of the fibrillated polyethylene of Example I. The materials were thoroughly mixed according to the procedure of the previous examples to produce a Test Composition G.

EXAMPLE VIII

A Test Composition H was prepared using the same procedure as in Example VII and the same ingredients but with different amounts. In this example 60 percent by weight of prepolymer X-100 is mixed with about 35 percent by weight of ground marble and about 5 percent by weight of the fibrillated polyethylene of Example I.

EXAMPLE IX

To 87 percent by weight of the prepolymer X-100 of Example I, there was added about 8 percent by weight of dehydrated calcined Georgia clay (Glomax) and about 5 percent by weight of the fibrillated polyethylene of Example I. The ingredients were thoroughly mixed as in the previous examples to produce a Test Composition I.

EXAMPLE X

A Test Composition J was then prepared from the same ingredients as in Example IX using the same mixing procedures to disperse the fibers in the prepolymer. In this case 75 percent by weight of the prepolymer X-100 was mixed with about 20 percent by weight of the Georgia clay and about 5 percent by weight of the fibrillated polyethylene of Example I.

EXAMPLE XI

A Test Composition K was prepared in the same way as in Example X, but in this example, 60 percent by weight of the prepolymer X-100 was mixed with about 35 percent by weight of the Georgia clay and about 5 percent by weight of the fibrillated polyethylene of Example I.

EXAMPLE XII

To 71 percent by weight of the prepolymer X-100 of Example I, there is added about 24 percent by weight of the Georgia clay of Examples IX to XI, about one percent by weight of a silane coupling agent, and about 4 percent by weight of dry high-density polyethylene fibers having a specific gravity of about 0.9, a moisture content below 2 percent, an average length of about 0.5 to 0.6 millimeters, a diameter of about 5 micrometers (microns), and a surface area (BET) of about 10 to 20 square meters per gram. The ingredients are thoroughly mixed for at least 10 minutes in an oxygen-free environment according to the procedure of Example I to produce a viscous essentially moisture-free Test Composition L with properties suitable for adhesion testing.

The Test Compositions A to L prepared according to the above examples were tested for extrusion and sag properties and were also allowed to stand for 24 hours to determine the amount of sweat out or exudation of liquid. In a polyurethane sealing composition, excessive sweat out is highly undesirable and produces an unacceptable product. The results of the tests are indicated in Table II. It is preferred that the PFER value be 2.5 or greater and that the Boeing sag value be 0.9 or less.

TABLE II

| Composition | PFER gm/15sec | Boeing Sag (inch) | Sweatout 24 hours |
|---|---|---|---|
| A | 6.2 | 0.4 | extreme |
| B | 5.1 | 0.2 | low |
| C | 6.4 | 0.2 | slight |
| D | 5.6 | 0.1 | slight |
| E | 0.5 | 0.0 | none |
| F | 5.5 | 1.8 | extreme |
| G | 11.9 | 3.0 | extreme |
| H | 2.1 | 0.2 | none |
| I | 7.7 | 1.0 | extreme |
| J | 7.4 | 0.8 | slight |
| K | 4.1 | 0.5 | none |
| L | 4.9 | 0.5 | slight |

Test Composition A is completely unacceptable because of extreme sweat out and because of poor appearance when applied to a joint. Test Composition B is unacceptable because of poor appearance, but the sweat out is greatly reduced. Test Compositions C, D and E have better appearance and good resistance to sweat out because of the inclusion of serpentine filler with the fibrillated polyethylene. Composition D has superior appearance and superior properties. Composition E is unacceptable because of the low PFER value which indicates a viscosity too high for extrusion in a caulking gun.

Test Composition F, which omits the polyethylene fibers, is completely unacceptable for use as a caulking composition because of the extreme sweat out and excessive sag, and the same is true of Test Composition G. The sweat and sag problems are cured in Test Composition H by increasing the amount of ground marble.

Test Composition I has acceptable PFER and Boeing Sag readings but is completely unacceptable because of extreme sweat out. Composition J, on the other hand, is excellent and has the properties desired in a caulking composition including a good appearance when applied to a joint. Table II indicates good properties when using relatively large amounts of the calcined Georgia clay as in Composition J, but lesser amounts of the clay will provide the cured composition with better physical properties.

Adhesion of the caulking Compositions A to K of Examples I to XI to glass, concrete, aluminum, steel or other substrates may be improved by applying conventional silicone or silane primers, such as Dow Corning's amino silane primer DC Z-6020, Union Carbide's Y-2500 silicone, or other commerical primers before the caulking composition is applied. Improved adhesion may also be achieved by incorporating suitable additives and/or coupling agents in the cauling composition as disclosed in U.S. Pat. Nos. 3,372,083 and 4,063,002. For example, excellent adhesion can be obtained from the sealants of the preceding examples by adding a small amount, such as 1 to 2 percent by weight of a conventional silane coupling agent. This is illustrated by Test Composition L which obtains excellent properties, good adhesion and good appearance when using lesser amounts of polyethylene fibers.

The smaller fibers of Example XII are more effective than the fibers of Example X in that they can obtain the desired results with a smaller total weight. In each of Examples I to XI, the fibrillated polyethylene fibers can be replaced with a lesser amount of the polyethylene fibers of Example XII to provide a sealant with comparable physical properties. This is illustrated by some of the theoretical examples which follow.

EXAMPLE XIII

A test composition is prepared using the same procedures and same ingredients as in Example X but the 5 percent by weight of polyethylene fibers is replaced by 3.5 percent by weight of the polyethylene fibers of Example XII. This produces a caulking composition with properties comparable to those of the caulking composition of Example X.

EXAMPLE XIV

A caulking composition is prepared using the same procedures and same ingredients as in Example X but the 20 percent by weight of Georgia kaolin is replaced by 20 percent by weight of titanium dioxide. The resulting composition is comparable to that of Example X, but the titanium dioxide is relatively expensive. It is preferable to employ 6 to 8 percent by weight of titanium dioxide and a greater amount of another filler, such as calcium carbonate, kaolin or the like, as in the example which follows

EXAMPLE XV

A caulking composition is prepared using the same procedures and same ingredients as in Example X except that the 20 percent by weight of Georgia kaolin is replaced by 7 percent by weight of titanium dioxide and 13 percent by weight of Georgia kaolin. The caulking compound has good properties and is comparable to the composition of Example X.

EXAMPLE XVI

A caulking composition is prepared using the same procedures and same ingredients as in Example X except that the 20 percent by weight of Georgia kaolin is replaced with 20 percent by weight of Asbestine. The composition is at least as good as that of Example X, has good non-sag properties and a viscosity suitable for extrusion through a caulking gun, and, when cured, provides a low modulus joint with good appearance and good physical properties. Superior results can be obtained, however, when the composition includes 6 to 8 percent by weight of titanium dioxide as in the example which follows

EXAMPLE XVII

To 73 percent by weight of the prepolymer X-100 of Example I there is added one percent by weight of a silane coupling agent, 12 percent by weight of Asbestine, 5 percent by weight of ground marble, 6 percent by weight of titanium dioxide and about 3 percent by weight of the fibrillated polyethylene of Example 12. The materials are thoroughly mixed as in the previous examples. A one-component moisture-curing caulking composition of this type with or without additional plasticizers can readily be compounded which has good non-sag properties and good flow characteristics for use in a caulking gun and which produces a high quality joint with excellent physical properties, good adhesion, good appearance, and a durometer hardness in the desired range of 35 to 40.

This type of joint sealant with 3 to 3.5 percent by weight of the fibrillated polyethylene in conjunction with 15 to 25 percent by weight of suitable fillers can be readily be compounded to provide a high quality low-modulus one-component moisture-curing elastomeric joint sealant able to function admirably with joints subject to substantial cyclic movement and able to obtain a class A rating according to Federal Specification II-S -00230C.

The same is true when the ground marble is replaced with kaolin, talc, chrysotile or other serpentine filler, titanium dioxide, and other suitable fillers when plasticizers or plasticizing adducts are included to reduce the cost of the sealant. Of course, other conventional additives may be included such as dispersants, antioxidants and the like.

Suitable plasticizers, fillers, catalysts, curing agents and other compounding ingredients useful in joint sealants are disclosed in U.S. Pat. No. 3,372.083. for example, the materials employed in Example XXVII of the latter patent can be successfully used with compositions such as disclosed in the preceding examples, particularly Examples IV, X, XII and XVII. Likewise, the softness and non-sag properties of sealing compounds disclosed in that patent can be greatly improved by incorporating 3 to 6 percent by weight of fibrillated polyethylene and 15 to 25 percent by weight of other fillers in the sealant (i.e. in the composition of the aforesaid Example XXVII).

EXAMPLE XVIII

An excellent caulking composition with good non-sag properties can be prepared using the same procedures and same ingredients as in Example XVII but using only 2 to 2.5 percent by weight of the fibrillated polyethylene and replacing the fillers with 7 to 8 percent by weight of ground marble, 8 percent by weight of titanium dioxide, and 8 to 9 percent by weight of chrysotile fibers. The latter should be used in limited amounts preferably below 10 percent by weight, to produce joint sealants having a Shore A durometer hardness from 42 to 50 and is advantageous in reducing the tendency of the sealant to yellow with age.

The type of plasticizer or filler best suited for a sealant depends on the use of the sealant and the color desired. Carbon black, coal tar and asphalt produce a dark color which may not be acceptable in some one-component caulking compositions requiring a light color. In that case, a coumarone-indene resin adduct may be more suitable as a plasticizer than an asphalt adduct. If, on the other hand, a lower MVT rate is more important than a light color, a coal tar or asphalt adduct might be a more suitable plasticizer.

In a two component sealant composition it may be desirable to place black pigment in part B to provide a visual aid to mixing and to provide a gray color to the final mix. Two component joint sealant compositions are illustrated in examples which follow.

The one component moisture-cured joint sealants of the preceding examples based on the polyurethane prepolymer X-100 are intended to be cured under ambient temperatures, such as 20° to 40° C., within a few days by moisture in the air to provide an elastomeric material with good tensile and elongation properties. Obviously they may also be used as Part A of a two-component sealant where Part B comprises a diol curing agent and/or a catalyst. For example, the compositions of Examples IV, X, XII, XVII and XVIII may be mixed with a conventional polyol curing agent such as Wyandotte's Pluracol TP-340, Union Carbide's LHT-240 Triol (M. W. 708), Pluracol TP-440 (a polypropylene oxide derivative of trimethylolpropane of 400 molecular weight), 1,4-butanediol or N,N-bis (hydroxypropylaniline), known as Isonol C-100, before the composition is extruded from a cauling gun and used to seal a joint.

It will also be apparant that the prepolymer X-100 of Example I and the various other examples may be replaced with various other conventional polyurethane prepolymers suitable for use in joint sealants and curable at ambient temperatures or mixtures of different prepolymers. For common joint sealing applications the prepolymers are preferably made by reacting a diisocyanate, such as MDI or TDI, with a hydroxyl-terminated polyether; however, for special applications requiring a low MVT rate, a hydroxyl-terminated polydiene is better than a polyether.

EXAMPLE XIX

This example illustrates preparation of a two-component polyurethane sealant suitable for adhesion to glass in dual-pane insulated glass panels and for other use where the sealant must have a very low moisture-vapor transmission (MVT) rate.

The two-part mixtures were prepared using the following recipe:

|  | Parts by Weight |
|---|---|
| Part A |  |
| Asphalt | 88 |
| Chlorinated paraffin | 24 |
| Polybutene | 24 |
| Carbon Black | 33 |
| Nonyl phenol | 5.5 |
| Crude MDI | 7.2 |
| Polydiene prepolymer (3.35% NCO) | 192 |
| Polyethylene fibers | 10 |
| Part B |  |
| Diol Curing Agent* | 5.4 |
| Chlorinated paraffin | 22 |
| Silane coupling agent | 6 |

-continued

|  | Parts by Weight |
| --- | --- |
| Water | 0.3 |
| Titanium dioxide | 4.8 |
| Dibutyl tin dilaurate | 1.7 |

*Preferably Isonol C-100

The polydiene prepolymer is preferably prepared from TDI (i.e. TD-80), a polyether diol, such as PPG-2025, and a commerical hydroxyl-terminated polybutadiene, such as Poly bd R-45HT made by Arco Chemical Company. The latter has a hydroxyl number of 46 to 47, a molecular weight of from about 2700 to about 2900, a viscosity at 30° C. of about 50 poise, a moisture content below 0.1 percent, a specific gravity at 30° C. of about 0.9, and a microstructure that is predominantly trans-1,4.

To a reactor vessel there is added 395 parts by weight of the TDI and 280 parts of xylene. Then there are added 2167 parts by weight of Poly bd R-45HT and 240 parts by weight of PPG-2025, which has a molecular weight of about 2000 and a hydroxyl number of about 56. The materials are then heated in the closed reactor to a temperature of about 70° to 72° C. and maintained at that temperature under a dry nitrogen atmosphere while agitating with a mixing blade for about 1.5 to 2 hours and for a sufficient time to complete the reaction and to provide a polydiene prepolymer with an NCO content of about 3.35 percent by weight. If desired the materials can be mixed and reacted under a vacuum. In preparing the composition of Part A above, all of the asphalt, chlorinated paraffin and polybutene are mixed together and then all of the nonyl phenol and crude MDI are added and mixed. The mixture is reacted for about 90 minutes under a dry nitrogen atmosphere at a temperature of about 82° to 83° C. while agitating with a mixer blade to form an asphalt adduct. During the reaction and 30 to 40 minutes after the mixture is heated, all of the carbon black pigment is added. At the end of the 90-minute reaction period, the mix is cooled to about 70° to 72° C. Then the 192 parts by weight of the polydiene prepolymer are added and mixed under a dry nitrogen atmosphere. After thorough mixing, all of the polyethylene fibers are added to the composition and mixed to distribute the fibers uniformly. This completes the preparation of Part A.

Part B is mixed separately and like Part A, may be stored for extended periods of time before use. Part B has a white color and a viscosity which is low compared to Part A, which is black in color. When Part A and Part B are mixed together in the amounts indicated, they produce a gray colored mix suitable for extrusion through a caulking gun and having good non-sag properties suitable for application to vertical joints. The gray mix has a PFER value of about 4.5 grams per 15 seconds and a Boeing sag of about 0.3 to 0.5 inch when using 9.5 to 10.5 parts by weight of the fibrillated polyethylene of Example I. (Similar results can be obtained using substantially less amounts of the fibrillated polyethylene of Example XII.)

When the two-component sealant of this example is applied and allowed to cure, it has a low modulus and excellent tensile properties and is well suited for insulated glass windows and other uses where a low MVT rate is necessary. The permeability (metric) as measured according to ASTM Test E-96 (Method B) is about 0.011 and only a small fraction of that of the more common commercial polyurethane joint sealants.

EXAMPLE XX

The asphalt adduct employed in Part A of the recipe listed in Example XIX may obviously be replaced with other plasticizing adducts or bituminous plasticizers including adducts of the type disclosed in U.S. Pat. No. 3,372,083. Of course, volatile solvents should not be used in substantial amounts if the sealant is to be used in dual-pane insulating glass windows or the like because of the adverse effects of vapor leakage to the sealed air space between the glass panes.

For instance, the asphalt of Part A of Example XIV can be replaced with 88 parts by weight of a coumarone-indene resin and the amount of Crude MDI reduced to about 5.4 parts. The amount of the fibrillated polyethylene would be increased from 10 to 14 parts.

The procedure for forming the plasticizing adduct and for making the composition of Part A is essentially the same as in Example XIX. The amounts of ingredients are different because the resulting coumarone-indene adduct is not the same as the asphalt adduct. When Part A and Part B of the present example are mixed together, the resulting gray mix has a PFER value of about 5.3 gram/15 sec. and a Boeing sag of about 0.4 inch. The permeability (ASTM E-96) is about 0.017 as compared to 0.011 for the cured material of Example XIX.

The plasticizers, pigments, and other additives employed in this example may obviously be replaced with other conventional compounding ingredients. Other diisocyanates, such as TDI, are well suited for making the adduct, and other tar acids or dispersants can be used to improve dispersion or reduce phase separation. A variety of different catalysts and curing agents can be used.

Most of the polyol curing agents used in commercial two-component elastomeric polyurethane joint sealants can be used in Part B including 2-ethyl-1,3-hexaneidiol, Isonol C-100, 1,4-butanediol, PPG-2025 and various other diol curing agents with molecular weights from 200 to 3000 or higher. Mixtures of different diols and/or triols can be used.

The polybutadiene-type polyurethane sealing composition made according to the present invention can readily be formulated to meet the requirements of multiple-pane insulating glass windows and to obtain a Class A rating under standard federal specifications, such as Federal Specification TT-S-00227B. The fibrillated polyethylene in combination with other fillers makes it possible to obtain a soft low-durometer elastomeric material and also to obtain the necessary non-sag properties with an extrudable mix, and the same is true of the diene-type sealants disclosed in U.S. Pat. No. 4,063,002 and other types of polyurethane sealants including the epoxy-type sealants disclosed in U.S. Pat. No. 3,445,436.

The fibrillated polyethylene used in the previous examples is highly branched and may have a structure substantially as shown in FIG. 1 of the drawings and an average surface area (BET) from 9 to 20 square meters per gram. Satisfactory results are also obtained when part or all of the fibrillar polyethylene of these examples are replaced with similar fibers of different sizes and surface area, such as fibrillar polyethylene with an average surface area (BET) of 15 to 30 square meters per gram, or fibers with comparable size and macrofibrillar structure but of a different type, such as fibrillated polypropylene and/or ethylene-propylene copolymers of the general type disclosed for example in U.S. Pat. No. 3,920,509 or British Pat. No. 1,430,796.

Good results are obtained when part or all of the polyethylene fibers of Examples I and XX are replaced by fibrillated polypropylene having a high surface area, such as 10 to 20 square meters per gram, a small diameter such as 3 to 10 microns, and a short fiber length, such as an average length of from 0.3 to 0.8 millimeters.

The urethane sealants of the preceding examples may obviously be modified in many different ways. The polyurethane prepolymer X-100 of Example 1, for example, may be replaced with other urethane prepolymers or mixtures of different prepolymers. In making a sealant for a specific use, conventional compounding ingredients will, of course, be employed as needed to obtain the desired properties.

It will be understood that, in accordance with the patent laws, modifications and variations of the specific methods, compositions and products disclosed herein may be made without departing from the spirit of the invention.

What is claimed is:

1. A laminate comprising two layers of glass secured together along their inner edge portions by an interposed layer of an elastomeric polyurethane sealant composition having a Shore A durometer hardness not in excess of 40 and an elongation of at least 150 percent, said polyurethane composition containing 2 to 8 percent by weight of a fibrillated polyolefin with a surface area of at least 5 square meters per gram and 8 to 30 percent by weight of a compatible cofiller that stabilizes the composition to prevent substantial exudation of liquid.

2. A laminate according to claim 1 wherein said composition contains 30 to 70 percent by weight of a polyurethane prepolymer having a free NCO content of 2 to 8 percent and prepared by reacting a hydroxyl-terminated polydiene with an organic diisocyanate.

3. A laminate according to claim 1 wherein the uncured sealant composition has a Boeing sag value no greater than 0.9 and a PFER value of at least 5 and may be cured at ambient temperatures below 40° C. to provide a high strength elastomer with an elongation of at least 150 percent and a shore A durometer hardness of from about 20 to about 40.

4. In an insulating glass unit comprising a pair of flat glass panes held in parallel spaced relation by a peripheral elastomeric sealant interposed between and adhered to the edge portions of the panes, said sealant containing at least 30 percent by weight of a polyurethane prepared by reacting an aromatic diisocyanate with a hydroxyl-terminated polydiene having a molecular weight of 2000 to 5000, the improvement wherein said sealant contains 2 to 8 percent by weight of a fibrillated polyolefin with a surface area (BET) of at least 5 square meters per gram and 8 to 30 percent by weight of a compatible cofiller that stabilizes the composition to prevent substantial exudation of liquid.

5. The combination of claim 4 wherein the sealant, when cured for 21 days, has a Shore A durometer hardness of from 35 to 45 and the cured sealant, when heat aged for 7 days at 70° C., has an elongation of at least 180 percent.

6. The combination of claim 4 wherein said fibrillated polyolefin is a polymer of a monoolefin having 2 to 3 carbon atoms and comprises a major portion by weight of a macrofibrils with a diameter up to 10 microns, an average length up to 1 millimeter, and an average aspect ratio of at least 30 to 1, and wherein the amounts of said fibrillated polyolefin and said cofiller are such that the composition as applied has a Boeing sag value below 0.9 and a PFER value above 2.5 and is essentially free of exuded liquid at the outer surface.

7. The combination of claim 4 wherein said fibrillated polyolefin and filler are present in an amount such that the uncured sealant composition has a Boeing sag value less than 0.5 and a PFER value of at least 2.5 and the cured composition has an elongation of at least 150 percent and a shore A durometer hardness below 45.

8. An article comprising a glass member, a metallic member for supporting said glass member, and an elastomeric polyurethane joint sealant composition disposed between and adhered to said glass member and said metallic member to hold them together, said joint sealant composition comprising 30 to 70 percent by weight of a polyurethane prepolymer with a free NCO content of 1.5 to 8 percent, up to 45 percent by weight of a plasticizer, 2 to 8 percent by weight of fibrillated polyolefin with a surface area (BET) of 5 to 30 square meters per gram, and 8 to 30 percent by weight of a compatible stabilizing cofiller that prevents substantial exudation of liquid.

9. An article comprising a first rigid metallic member, a second rigid member spaced from said first member to provide a narrow joint, and an elastomeric polyurethane joint composition disposed between and adhered to said members to seal said joint, said composition comprising 30 to 70 percent by weight of a polyurethane prepolymer with a free NCO content of 1.5 to 8 percent, up to 45 percent by weight of a viscous plasticizer, 2 to 8 percent by weight of fibrillated polyolefin with a surface area (BET) of at least 5 square meters per gram comprising a major portion by weight of macrofibrils with a diameter of 1 to 10 microns and an average length up to 1 millimeter, and 8 to 30 percent by weight of a compatible cofiller that stabilizes the composition to prevent substantial exudation of liquid.

10. The combination of claim 8 or claim 9 wherein said prepolymer is prepared by reacting a hydroxyl-terminated polydiene having a molecular weight of 2000 to 5000 with an organic polyisocyanate having 2 to 3 isocyanate groups.

11. The combination of claim 1, claim 4 or claim 9 wherein a major portion by weight of said fibrillated polyolefin comprises fibrils with a diameter from 1 to 10 microns and a length below 0.8 millimeters.

12. The combination of claim 1, claim 4, claim 8 or claim 9 wherein said polyolefin comprises macrofibrils having an average diameter below 20 microns and an average aspect ratio of at least 30 to 1, and wherein the amounts of said fibrillated polyolefin and said cofiller are such that the composition as applied has a Boeing sag value below 0.9 and a PFER value above 2.5 and when cured provides a strong soft low-modulus elastomeric sealant with an elongation of at least 150 percent and a Shore A durometer hardness of from about 20 to about 40.

13. The combination of claim 12 wherein said fibrillated polyolefin is a polymer of one or more mono-olefins having 2 to 6 carbon atoms and has an average fiber length below one millimeter.

* * * * *